United States Patent [19]
Roth

[11] 4,439,003
[45] Mar. 27, 1984

[54] REMOTE COUNTER-BALANCING MECHANISM
[75] Inventor: Ronald B. Roth, Boxboro, Mass.
[73] Assignee: Honeywell Inc., Minneapolis, Minn.
[21] Appl. No.: 291,538
[22] Filed: Aug. 10, 1981
[51] Int. Cl.³ ............................................. G02B 27/17
[52] U.S. Cl. .................. 350/6.6; 248/123.1; 350/500
[58] Field of Search ................ 350/6.6, 500; 248/331, 248/648, 280.1, 123.1

[56] References Cited
U.S. PATENT DOCUMENTS

| | | | |
|---|---|---|---|
| 3,468,595 | 9/1969 | Humphrey | 350/500 |
| 3,506,356 | 4/1970 | Stringfield | 350/6.6 |
| 3,612,643 | 10/1971 | Weber | 350/500 |
| 3,892,467 | 7/1975 | Shin | 350/500 |

FOREIGN PATENT DOCUMENTS 2110921 9/1972 Fed. Rep. of Germany ....... 350/6.6

Primary Examiner—John K. Corbin
Assistant Examiner—Rebecca D. Gass
Attorney, Agent, or Firm—John S. Solakian; Laurence J. Marhoefer

[57] ABSTRACT

An opto-mechanical scanning system in which a counterbalancing mechanism is placed in a remote location from and on a different plane than the scanning mirror, thereby minimizing the effect of system spatial constraints which would normally preclude adequate counterweighting.

13 Claims, 4 Drawing Figures

REMOTE COUNTER-BALANCING MECHANISM

BACKGROUND OF THE INVENTION

The present invention relates to counterbalancing mechanisms, and, more specifically, those used in opto-mechanical assemblies of infrared imaging systems.

Such systems often include a pivoting planar mirror assembly whose rotation is motor driven to provide a means of optically scanning a scene of interest. This type of mirror may be quite heavy, and, therefore, require counterbalancing to provide necessary rotational response while minimizing power requirements of the driving motor, or to prevent degradation in system performance, especially under shock and vibration conditions.

In the past, counterbalancing of this type of scanning mirror has been achieved by placing the center of gravity of a counterweight of appropriate mass on a plane described by the center of gravity of the mirror and the line which the mirror rotates about, such that the center of gravity of the mirror, counterweight and pivot point are colinear, and such that the center of gravity of the mirror and counterweight are on either side of the pivot axis. The mass and location of the counterweight can be determined by the following relationship:

$$m_1 d_1 = m_2 d_2;$$

where $m_1$ and $m_2$ are the respective masses of the mirror and counterweight, and $d_1$ and $d_2$ are the respective moment arm distances between the centers of gravity of $m_1$ and $m_2$ and the pivot point, as measured perpendicular to the pivot axis. In addition to providing balancing in all directions, this arrangement provides increased resistance to shock and vibration damage which are often required in these systems. The disadvantage of this approach is that the counterweight is often in a position which requires a significant increase in volume of the total scan system, or the counterweight requires positioning that will not fit within the system's physical boundaries.

It is, accordingly, a primary object of the present invention to provide a means for counterbalancing an opto-mechanical scanning mechanism where spacial constraints of the packaging of the system would normally preclude adequate counterweighting.

SUMMARY OF THE INVENTION

The purposes and objects of the present invention are achieved according to the present invention by providing a mechanical linkage between a counterweight and device to be balanced, so that the motion of the counterweight and associated arm can be translated to a more convenient location, within the packaging constraints of the system. The form of this mechanical linkage may vary with a specific application. However, if the linking mechanism is intrinsically balanced, the mass and length of the remote counterweight arm may remain the same as in the case of the counterweight fixed directly to the moving mechanism as described hereinbefore for other systems. As an example of intrinsically balanced systems, the linkage mechanism might simply include a belt and pulley, or a four-bar parallelogram, or a chain or a gear-driven linkage. Other linkage mechanisms which are not intrinsically balanced could also be used if necessary adjustments to the weight and arm length of the counterbalance were made.

BRIEF DESCRIPTION OF THE DRAWINGS

The above and other objects of the present invention are achieved in an illustrative embodiment as described with respect to the Figures in which.

DETAILED DESCRIPTION OF THE PREFERRED EMBODIMENT(S)

Figure 1:
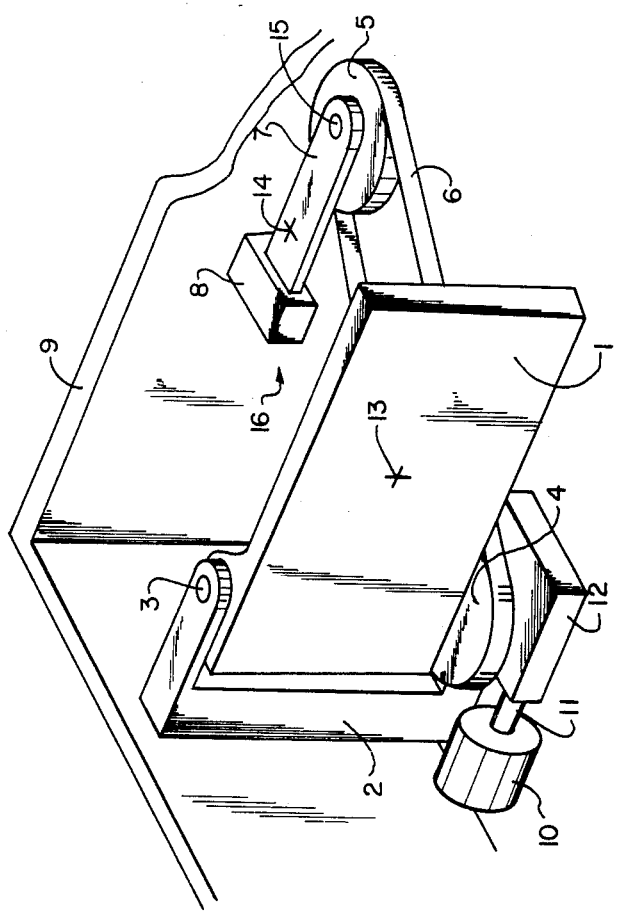
FIG. 1 shows an isometric view of a fixed-pivot scan mirror assembly balanced using the present invention.
Figure 2A:
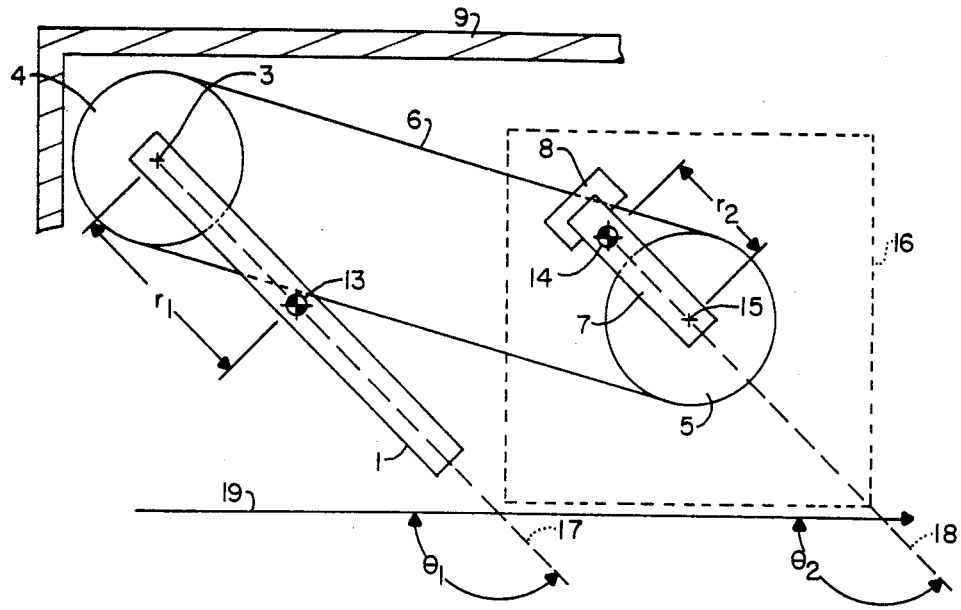
FIGS. 2A and 2B respectively illustrate the relative positions of the scan mirror and counterbalance assembly of the present invention at the extreme scan mirror positions.
Figure 2B:
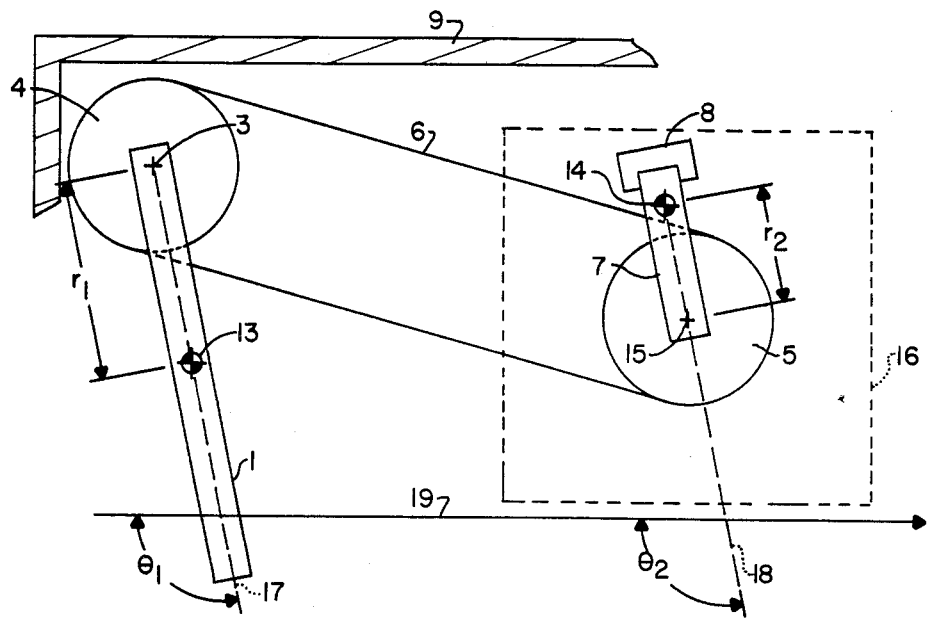

Referring to FIGS. 1, 2A and 2B, the remote counterweight and linkage to a single-point pivot scan mirror assembly is shown. A case which houses the imaging system, of which the scan mirror assembly is a component, is also shown. By way of example, the case is positioned to prohibit placement of a counterweight on the other side of the pivot point of the scan mirror.

The application of the subject invention to the problem of balancing such a scan mechanism is made by way of example. It is not intended to imply restriction of use of the invention to the balancing of any particular device. The invention may be applied in any device where spacial constraints prohibit traditional counterbalancing of a moving mechanical assembly.

The scan mirror 1 is mounted to mirror frame 2 via fixed pivot point 3, about which mirror 1 is able to rotate. The rotation of mirror 1 is accomplished through a drive mechanism which includes motor 10 connected to gear box 12 through coupling 11. An output shaft (not shown) of gear box 12 is fixed to both mirror 1 and pulley 4, such that pulley 4 and mirror 1 rotate in unison. Pulley 4 is connected to pulley 5 and the remote counterweight assembly 16 via belt 6. Pulley 5 rotates freely about pivot 15. Counterweight 8 and arm 7 are fixed to pulley 5 at pivot 15, such that motion of belt 6, caused by rotation of mirror 1 and pulley 4, causes pulley 5 and arm 7 to rotate in unison. The center of gravity of mirror 1, and counterweight 8 and arm 7, are shown by points 13 and 14, respectively. The line of action 17 of mirror 1 (defined as the line connecting the center of gravity 13 with the pivot 3), the line of action 18 of the counterweight assembly 16 (defined as the line connecting the center of gravity 14 with the pivot 15), and a case 9 which encloses the entire device, are also shown. It should be noted that the center of gravity may not be located in, for example, the plane of the mirror, and, accordingly, the line of action need not necessarily pass through the plane of mirror 1, but may be offset therefrom so long as such line of action runs from the pivot point through the center of gravity.

In FIGS. 2A and 2B, the geometric relationships of the constituent elements of the system are shown in top view. The segments designated $r_1$ and $r_2$, respectively, are moment arms and represent the distance between pivot 3 and the mirror's center of gravity 13, and the distance between the counterweight's center of gravity 14 and pivot 15, as measured along the respective lines of action 17 and 18. Angles $\theta_1$ and $\theta_2$, respectively, represent the angles that the lines of action 17 and 18 make with an arbitrary axis 19 at any point in time.

For the remotely positioned weight to balance the mirror assembly, the torque created at the center of gravity of each assembly must be equal. That is:

$$T_{cg1} = T_{cg2},$$

where $T_{cg1}$ and $T_{cg2}$ are the torques at points 13 and 14, respectively,
where $$T_{cg1} = \frac{m_1 r_1 \sin \theta_1}{r_{p1}},$$

and $$T_{cg2} = \frac{m_2 r_2 \sin \theta_2}{r_{p2}}, \text{ and}$$

therefore for optimum operation:

$$\frac{m_1 r_1 \sin \theta_1}{r_{p1}} = \frac{m_2 r_2 \sin \theta_2}{r_{p2}},$$

where $m_1$ is the mass of mirror 1 and $m_2$ is the mass of the counterweight 8 and arm 7, and $r_{p1}$ and $r_{p2}$ are the radii of pulleys 4 and 5, respectively.

If the radii of pulleys 4 and 5 are equal, and the position of arm 7 is initially fixed such that the lines of action 17 and 18 are parallel ($\theta_1 = \theta_2$), it can be seen that:

$$m_1 r_1 = m_2 r_2.$$

As a result, this remotely positioned counterweight assembly will be balanced and have optimum operation for any angle of applied acceleration, since the final relationship between mass and moment arm of the mirror and counterweight are independent of rotational position.

Figure 3:
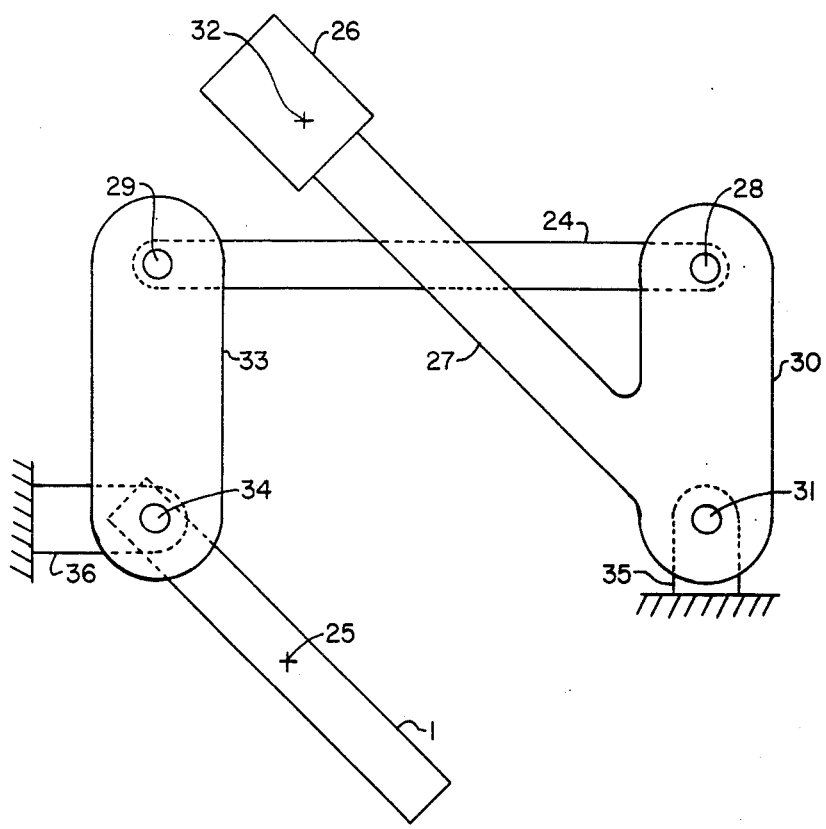
FIG. 3 illustrates a top view of an alternative embodiment of the present invention.

In another embodiment, a set of sprockets and chain assembly might be used to replace the pulleys 4 and 5 and belt 6. In still another embodiment, a four-bar parallelogram linkage, which is not intrinsically balanced, may be used to connect the mirror and counterbalance assemblies, as illustrated in FIG. 3. In such embodiment the mirror 1, mirror frame 36, fixed pivot point 34, mirror center of gravity 25, and obstructing case 9 (not shown in FIG. 3) are positioned as shown for the corresponding components in FIGS. 1, 2A and 2B. The four-bar parallelogram linkage between mirror 1 and mirror balance arm 27 with counterweight 26 is constructed in the following manner. A first link 33, of length A (between pivots 29 and 34) is fixed to the mirror 1 on one end, such that it rotates in unison with mirror 1 about pivot 34 of mirror frame 36. The opposite end of link 33 is joined to a second link 24 of length B (between pivots 28 and 29), at a movable pivot 29. The opposite end of this link 24 is joined at a second movable pivot 28 to a third link 30, also of length A (between pivots 31 and 28). The opposite end of link 30 is joined to a fixed pivot frame 35 at pivot 31. The fourth link of the four-bar linkage is formed by length B of the frame between fixed pivot 34 at frame 36 and pivot 31 at frame 35. In practice, link lengths A and B may be equal, but this is not required to form a parallelogram linkage. Mirror balance arm 27 is fixed to link 30 at pivot 31, such that the line of action of the counterbalance assembly is parallel to the line of action of the mirror assembly, and such that the counterbalance arm 27 rotates in unison with link 30.

Because the four-bar linkage of FIG. 3 is not intrinsically balanced, the equations set forth hereinbefore may not be directly used. However, the four-bar linkage of FIG. 3 may be intrinsically balanced if the fourth link of FIG. 3, as discussed hereinabove, is replaced with a link similar to link 24 on extensions of links 33 and 30.

Having described the invention, what is claimed as new and novel and for which it is desired to secure Letters Patent is:

1. A system comprising:
   A. a mechanical assembly having a single pivot point;
   B. a counterweight assembly;
   C. means for rotating said mechanical assembly about said single pivot point; and
   D. means for mechanically linking said counterweight assembly and said mechanical assembly, said means for linking comprising
      (i) means for enabling the pivoting of said counterweight assembly about another pivot point,
      (ii) wherein a line through the center of gravity of said mechanical assembly and through said single pivot point is a first line of action and wherein a line through the center of gravity of said counterweight assembly and said another pivot point is a second line of action,
      (iii) means for enabling said first and second lines of action to be substantially parallel as said mechanical assembly is rotated, and
      (iv) means for enabling a torque created at said center of gravity of said mechanical assembly to be substantially equal to a torque at said center of gravity of said counterweight assembly.

2. A system as in claim 1 wherein said means for linking comprises:
   A. first pulley means mounted for rotation about said single pivot point when said mechanical assembly rotates;
   B. second pulley means mounted for rotation about said another pivot point when said counterweight assembly rotates; and
   C. means for coupling said first pulley means to said second pulley means so that said second pulley means, as well as said counterweight assembly, rotates when said mechanical assembly rotates.

3. A system as in claim 2 wherein said means for coupling is an endless belt.

4. A system as in claim 3 wherein the diameters of said first and second pulley means are equal.

5. A system as in claim 1 wherein the distance between said single pivot point and the center of gravity of said mechanical assembly is equal to the distance between said another pivot point and the center of gravity of said counterweight assembly.

6. A system as in claim 1 wherein said mechanical assembly is an optical scanning mirror for use in infrared imaging systems.

7. A system as in claim 6 further comprising motor means coupled to rotate said mirror about said single pivot point.

8. A system as in claim 1 wherein said means for linking comprises:
   A. a first gear mounted for rotation about said single pivot point when said mechanical assembly rotates;
   B. a second gear mounted for rotation about said another pivot point when said counterweight assembly rotates; and C. means for coupling said first and second gears so that said second gear rotates when said mechanical assembly rotates.

9. A system as in claim 1, wherein said means for linking comprises:
   A. a first circular sprocket mounted for rotation about said single pivot point when said mechanical assembly rotates;
   B. a second circular sprocket mounted for rotation about said another pivot point when said counterweight assembly rotates; and
   C. chain means for coupling said first and second sprockets so that said second sprocket rotates when said mechanical assembly rotates.

10. A system as in claim 1 wherein said means for linking includes a four-bar linkage assembly.

11. A system as in claim 10 wherein said four-bar linkage assembly comprises
   A. first, second, third and fourth link bars;
   B. means for coupling said first bar for movement when said mechanical assembly rotates;
   C. means for coupling said third bar for movement when said first bar moves, said means for coupling including said second bar; and
   D. means for coupling said fourth bar with said first and third bars.

12. A system as in claim 11 wherein said fourth bar is fixed and does not move.

13. A system as in claim 11 wherein said fourth bar is coupled for movement when said first and third bars move.

* * * * *